March 21, 1939.  D. G. HAWTHORN  2,151,206
DRILL STEM SECTION
Filed Jan. 14, 1936

INVENTOR
David G. Hawthorn
BY Kenyon & Kenyon
ATTORNEYS

Patented Mar. 21, 1939

2,151,206

UNITED STATES PATENT OFFICE 2,151,206

DRILL STEM SECTION

David G. Hawthorn, Tulsa, Okla., assignor to Geophysical Research Corporation, New York, N. Y., a corporation of New Jersey Application January 14, 1936, Serial No. 59,097

3 Claims. (Cl. 255—28)

In applicant's Patent 2,096,359 of October 19, 1937 in Figure 6 is disclosed a drill stem composed of pipe sections having means for conducting an electrical current from the top of the drill stem to the drill bit at the lower end of the drill stem. The present application is concerned with the pipe section which is the basis of the drill stem structure disclosed in the aforesaid application and with the method of producing the same.

The pipe section according to the present invention differs from the pipe section previously used in drill stems in that a metallic conduit extends longitudinally of the pipe section and is brazed to the inner periphery of the pipe section, this conduit being for the purpose of receiving an electrical conductor. Brazing of the conduit to the pipe is effected by laying the conduit in the pipe longitudinally thereof, arranging brazing material in contact with both the pipe and conduit, supplying flux thereto and subjecting the pipe and conduit to sufficient heat to liquefy the brazing material which is then drawn in between the pipe and conduit by capillary attraction to firmly attach the conduit to the pipe. The brazing material may be in the form of rods arranged adjacent the edges of the surface of contact between the conduit and pipe or may be in the form of a wire mesh interposed between the conduit and pipe.

Other objects, novel features and advantages of this invention will become apparent from the following specification and accompanying drawing, wherein.

Figure 1:
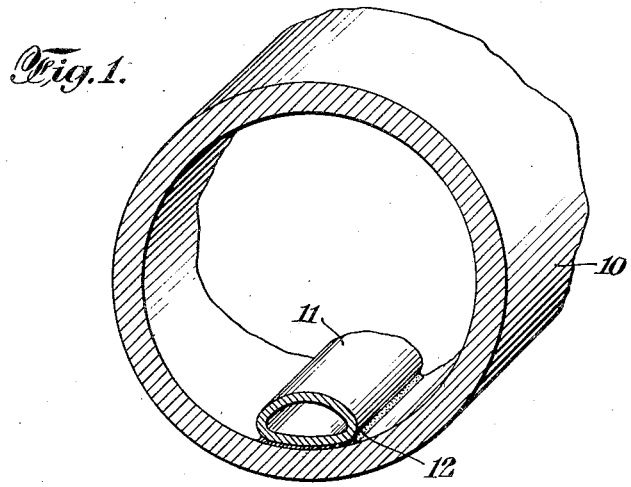
Fig. 1 is a fragmentary perspective view of a pipe section embodying the invention.

Fig. 1 illustrates the finished article in which 10 is a length of pipe and 11 is a conduit of much smaller cross-sectional area than the pipe but having one portion of its exterior surface of substantially the same curvature as the curvature of the inner periphery of the pipe 10. The conduit is permanently attached to the inner periphery of the pipe by the brazing material 12.

Figure 2:
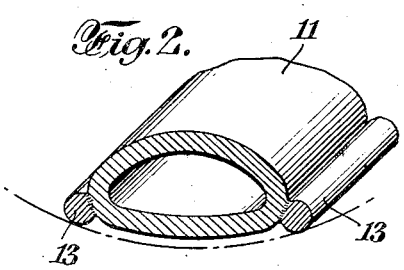
Fig. 2 is a fragmentary perspective view of a conduit prepared for the brazing operation.
Figure 3:
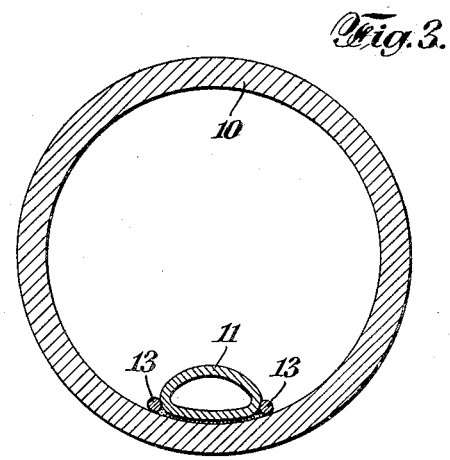
Fig. 3 is a transverse section through a pipe with the conduit in position for the heat treatment.

In preparing the conduit for the brazing operation, rods 13 of brazing material may be spot-welded as shown in Fig. 2 to the conduit along the edges of that surface which has the same curvature as the inner periphery of the pipe 10. The rods 13 may be attached in such manner that the surface of the conduit lies against the inner periphery of the pipe 10 or is slightly spaced therefrom. The conduit is then arranged in the pipe as shown in Fig. 3, after the surface between the rods 13 has been coated with suitable flux.

Figure 4:
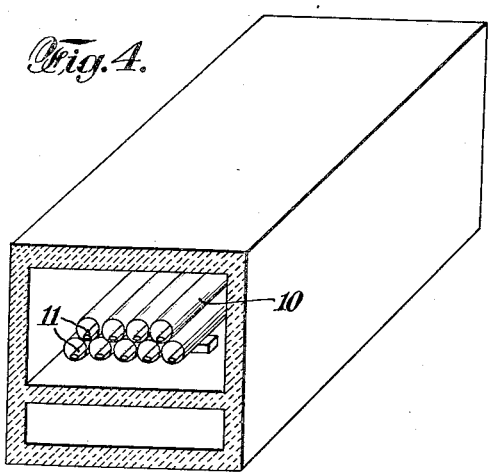
Fig. 4 illustrates the heat treatment step of the process.

The pipe with the conduit therein, together with several other similar pipes are then introduced into the furnace shown in Fig. 4 and subjected to sufficient heat to liquefy the brazing material which is drawn by capillary attraction between the conduit and the inner periphery of the pipe. After cooling sufficiently in the furnace to solidify the brazing material, the pipe is withdrawn from the furnace and is ready for use as a section of the drill stem illustrated in said Patent 2,096,359.

Figure 5:
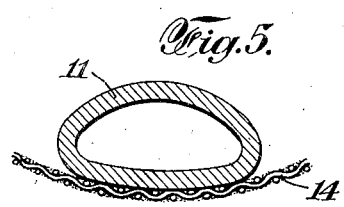
Fig. 5 is a view similar to Fig. 2 showing the modified form of brazing material.

Instead of using brazing material in the form of rods 13, the brazing material may be in the form of a mesh 14 spot-welded to the conduit 11 and interposed between it and the inner periphery of the pipe 10 (Fig. 5). With this arrangement, the flux will be received within the interstices of the mesh and the width of the mesh will be sufficient to provide the proper amount of brazing material to join the conduit firmly to the pipe.

The brazing operation may be effected in conjunction with the normal heat treatment of the pipe. The drill stem pipe is ordinarily composed of an alloy which has to be heat treated in order to give it the desired characteristics and such heat treatment may be utilized simultaneously to braze the conduit in the pipe.

I claim:

1. A drill stem section comprising a seamless metal pipe of uniform composition and a seamless metal conduit of uniform composition completely enclosed by and extending longitudinally of said pipe, said conduit having a portion of its exterior surface of substantially the same curvature as the inner surface of said pipe and having said portion brazed to said inner surface.

2. A drill stem section comprising a seamless metal tube surrounding a metal conduit extending longitudinally thereof, said conduit being brazed to the inner surface of said tube.

3. A drill stem section comprising a seamless metal tube having a seamless metal conduit brazed to its interior surface and extending longitudinally throughout the length of said tube.

DAVID G. HAWTHORN.